Aug. 22, 1933.  W. H. MASON  1,923,105
PROCESS FOR PRODUCTION OF NONWARPING FIBER BOARDS
Original Filed Dec. 11, 1929  6 Sheets-Sheet 1
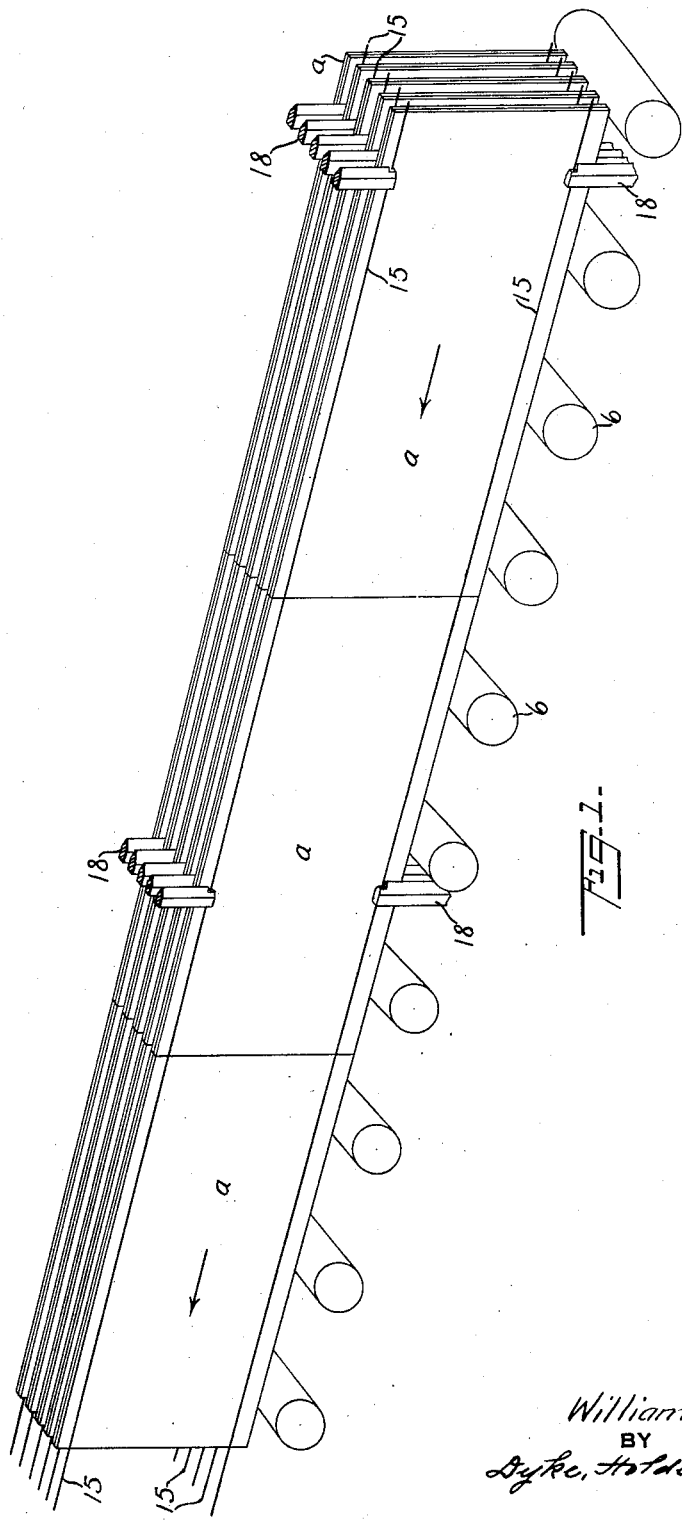

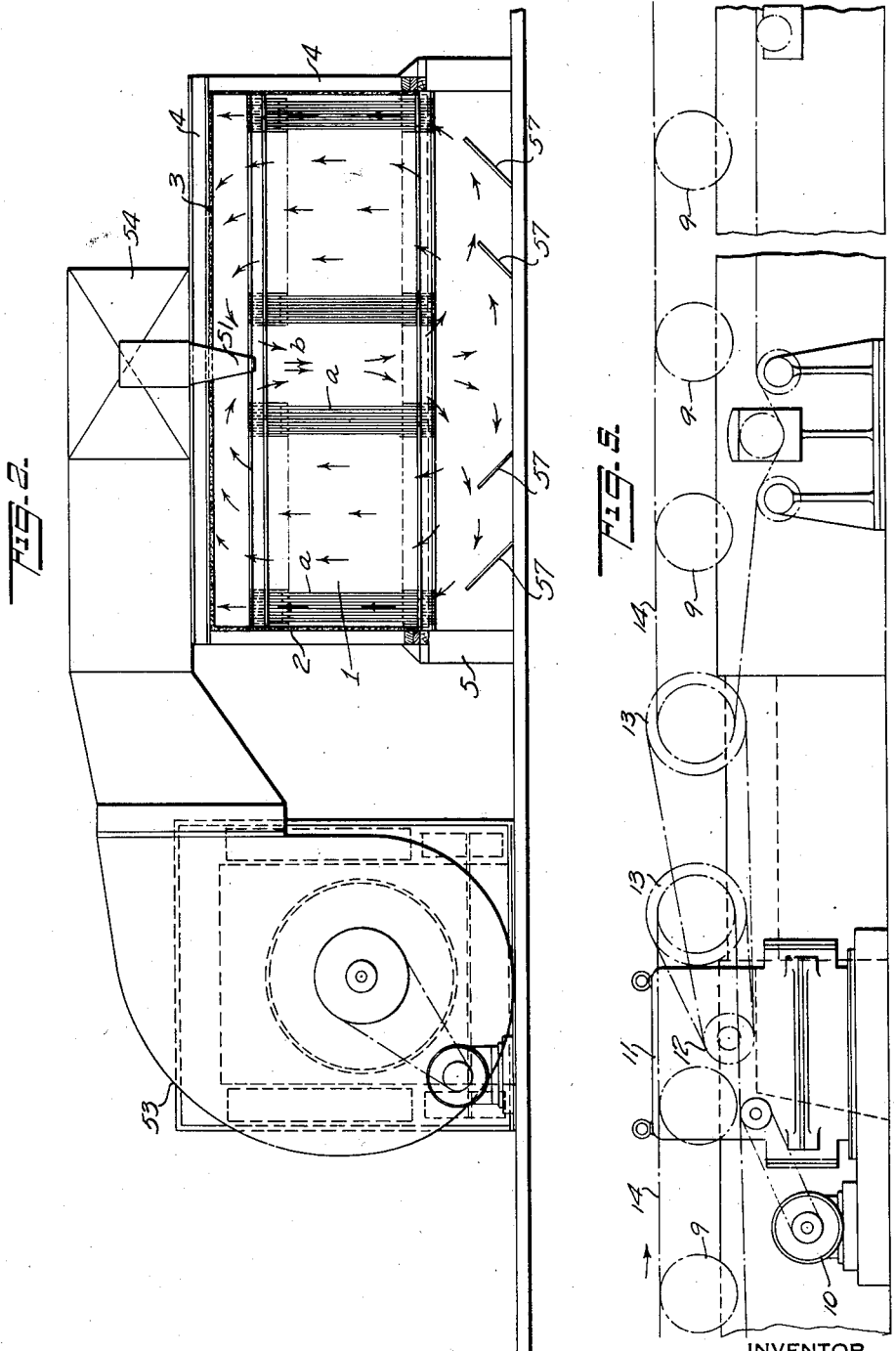

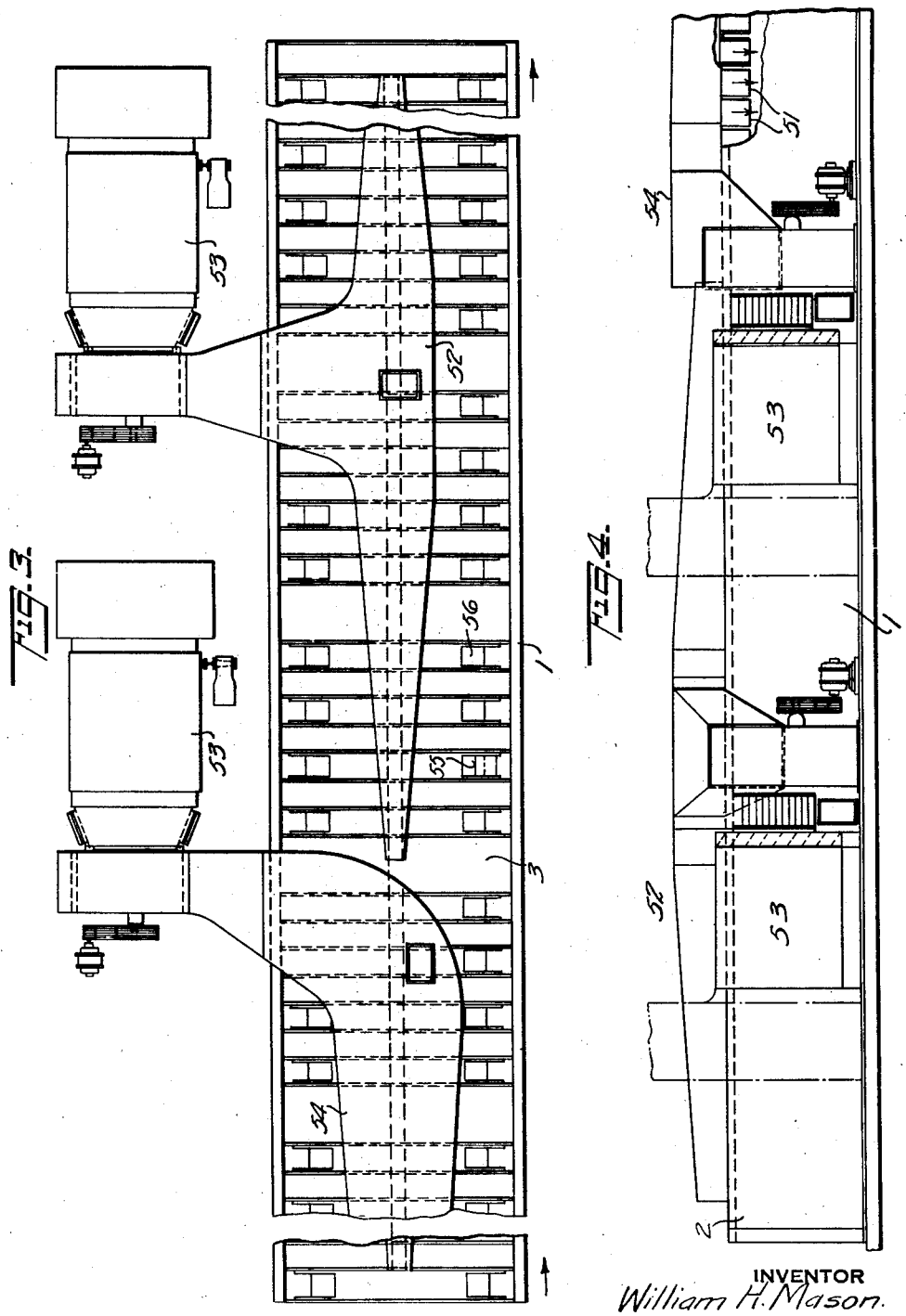

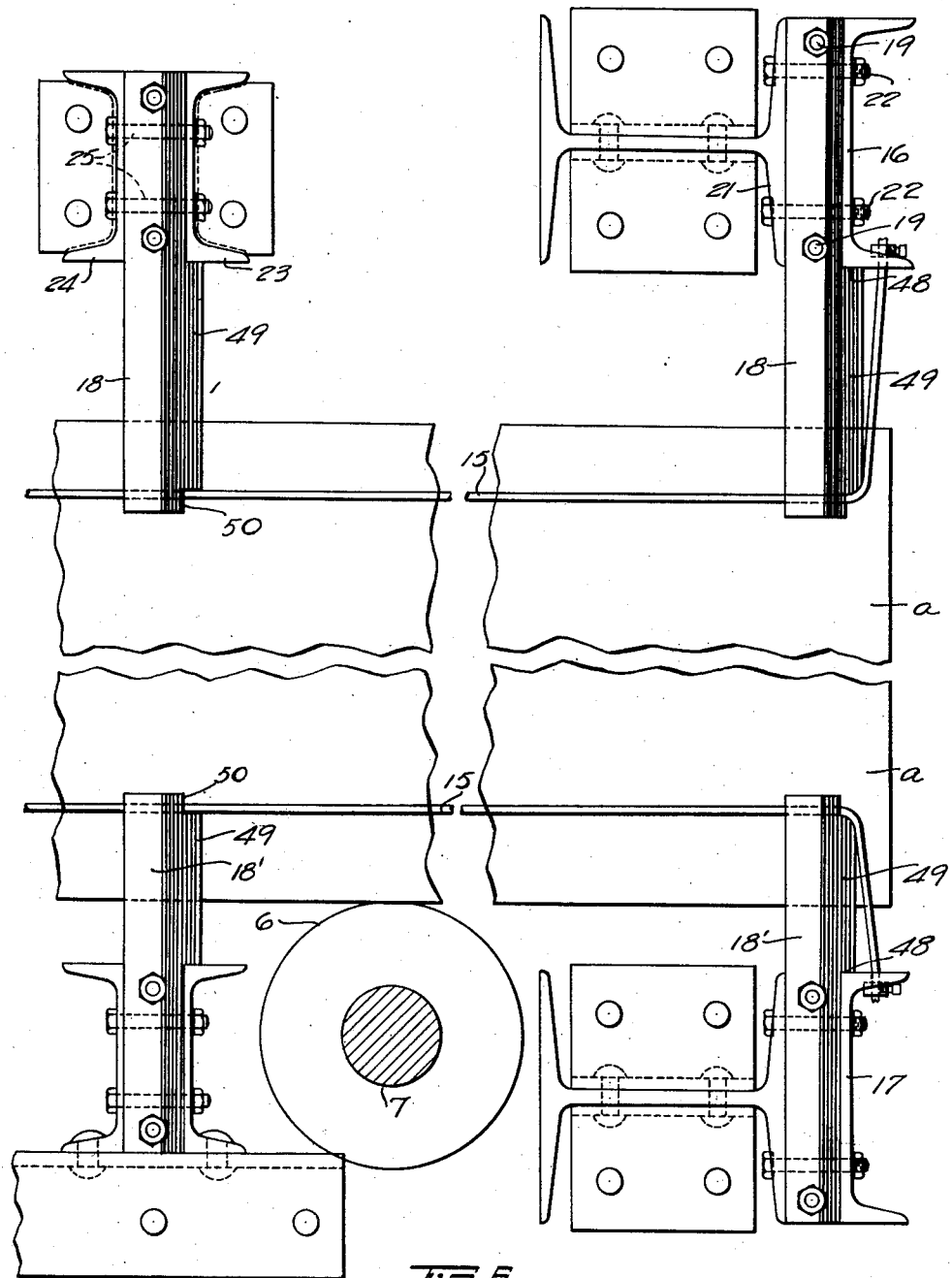

Aug. 22, 1933.    W. H. MASON    1,923,105
PROCESS FOR PRODUCTION OF NONWARPING FIBER BOARDS
Original Filed Dec. 11, 1929    6 Sheets-Sheet 5
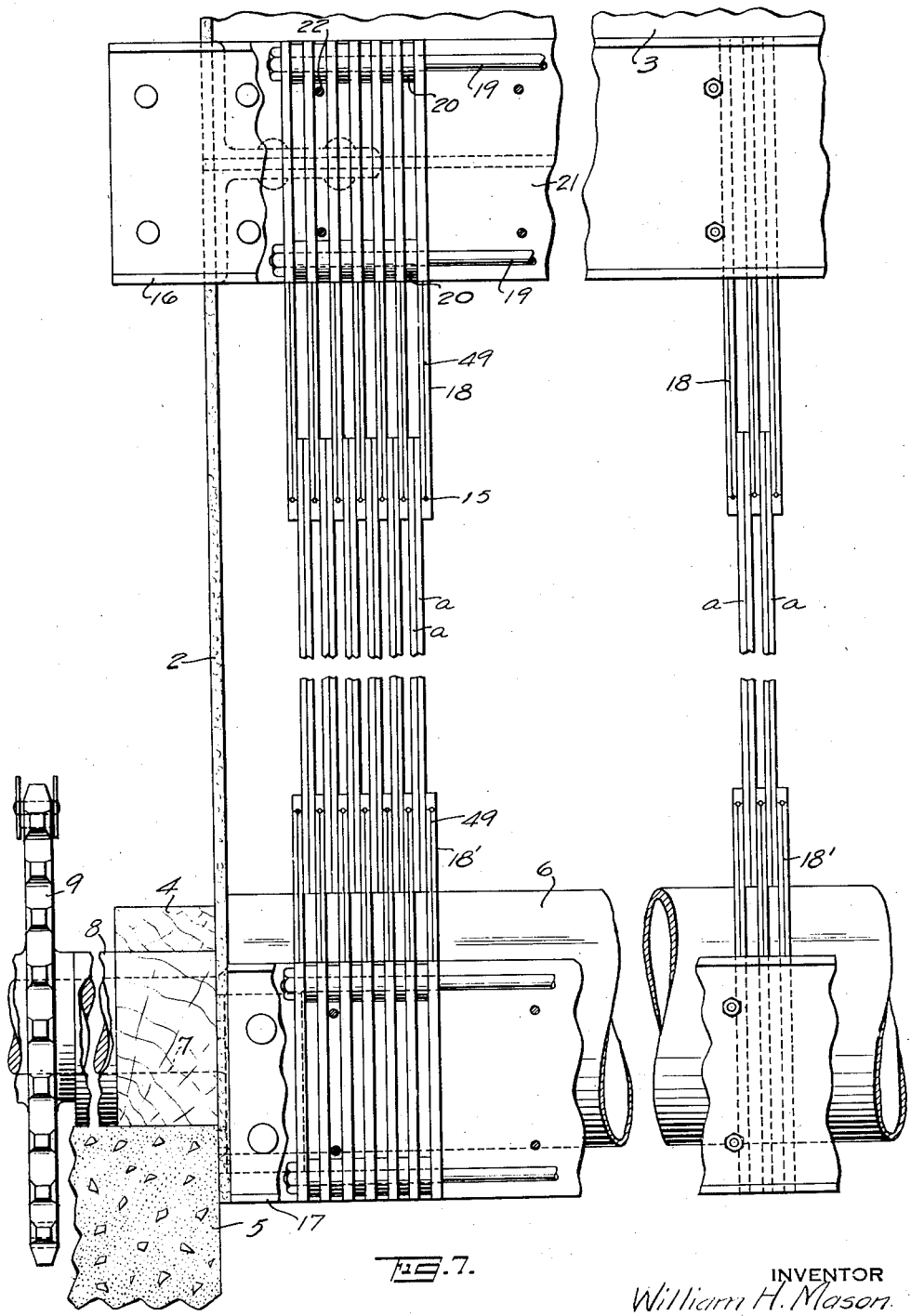
INVENTOR
William H. Mason
BY
Dyke, Holden & Schaines
ATTORNEYS.

Aug. 22, 1933.  W. H. MASON  1,923,105
PROCESS FOR PRODUCTION OF NONWARPING FIBER BOARDS
Original Filed Dec. 11, 1929   6 Sheets-Sheet 6
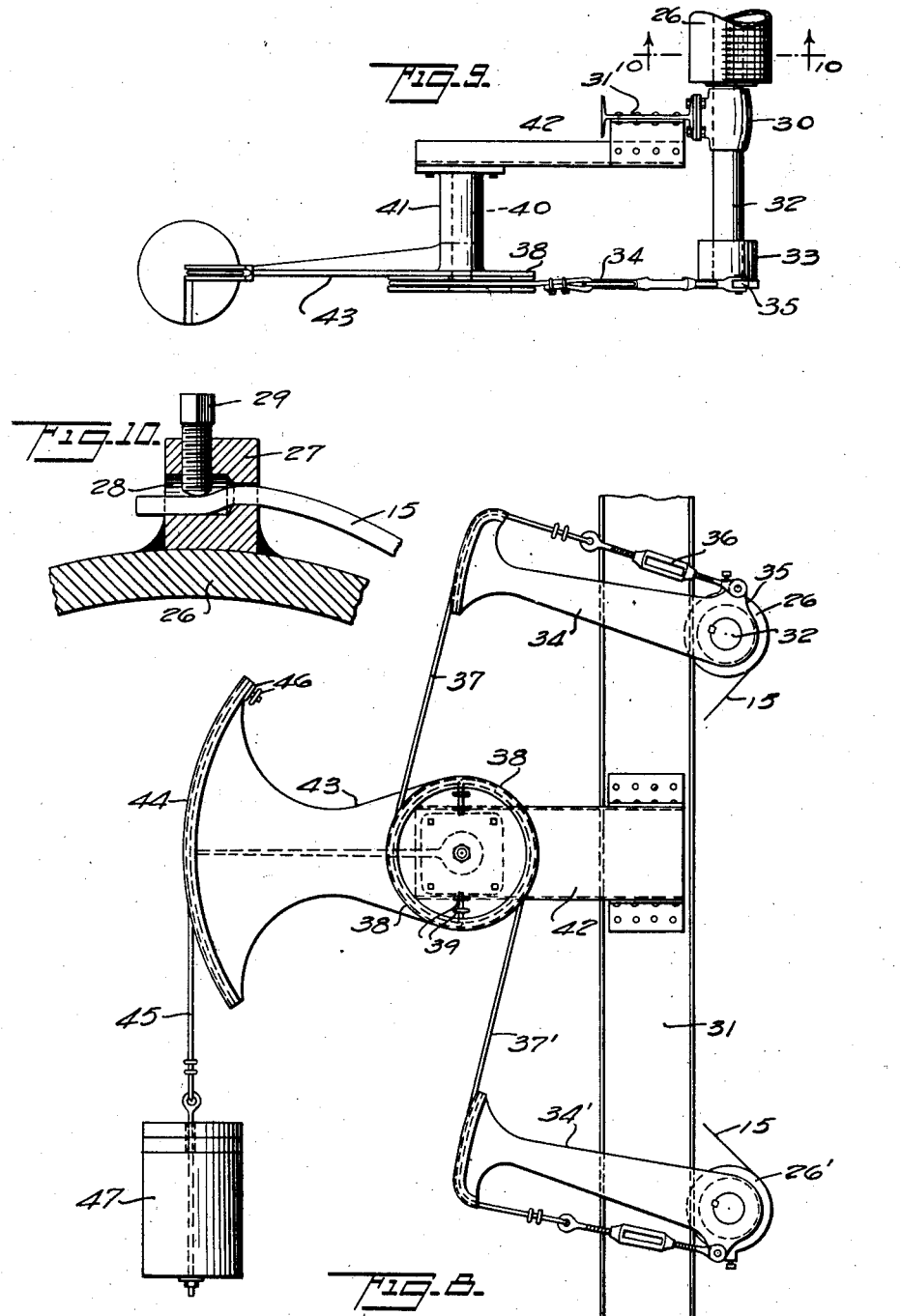
INVENTOR
William H. Mason
BY
ATTORNEYS.

Patented Aug. 22, 1933

1,923,105

UNITED STATES PATENT OFFICE 1,923,105

PROCESS FOR PRODUCTION OF NON-WARPING FIBER BOARDS

William H. Mason, Laurel, Miss., assignor to Masonite Corporation, Laurel, Miss., a Corporation of Delaware Application December 11, 1929, Serial No. 413,198
Renewed November 4, 1932

6 Claims. (Cl. 92—54)

My invention relates to an improved process for the production of hot-pressed non-warping fiber boards.

In the manufacture of boards of vegetable fiber pulp, I have found it of great advantage to retain in the raw pulp a large percentage of the lignin of the material from which the pulp is made, by preference substantially all of it, and to subject lignin and cellulose containing material to sufficient pressure and heat to cause the lignin and cellulose to become compacted, bonded or welded and substantially dried into a very strong, hard, rigid, substantially non-porous body or sheet of high specific gravity such as a gravity of approximately one or more than one for example, a pressure of 200 lbs. per square inch or more at a temperature above 212° Fahrenheit. During the pressing operation at least one surface of the material should be in contact with wire mesh or other foraminous material, placed between it and the press platen. A press suitable for the simultaneous pressing of a large number of boards is shown in my application Serial No. 357,737, filed April 24, 1929.

In producing a board of the character mentioned it is highly desirable that the moisture content of the finished product be as high as 6% or 8%, since a board which contains substantially less moisture than this when exposed to atmospheric air of ordinary humidity has a tendency to absorb moisture therefrom.

Such absorption is ordinarily very slight as long as the sheets are arranged in piles, as in a warehouse or freight car and the boards preserve their shape. But when the board is secured in position upon a wall or is otherwise fully exposed to atmospheric air, it absorbs water vapor therefrom, swells irregularly and buckles. In some cases such buckling or warping takes place before the board is secured in position.

In order to obtain a board having a desired moisture content the board may be removed from the press before the percentage of moisture falls below the 6% or 8% mentioned, but in order to prevent injury to the board by the expansion (as steam) of such moisture, it is necessary to cool the press and board to a temperature below 212° F. Such cooling and the subsequent reheating of the press for operating upon succeeding sheets of material is very wasteful as regards both time and heat units and unduly increases the cost of production.

I prefer therefore to hold the sheets in the press under high temperature and pressure until subsequently dry, to open the press while still at high temperature, and to thereupon treat the boards (which may be still in heated condition), with humid air, in such manner as to bring their moisture content up to approximately 6 to 8%, within a reasonably short time.

The apparatus is preferably so constructed as to operate in a continuous manner upon very large quantities of material without occupying an unduly large floor space or consuming an inordinate amount of power or heat units.

Furthermore the humidifier is preferably so arranged that material may be readily inserted within the humidifying chamber and withdrawn therefrom, and that the boards will be carried through such chamber in closely spaced relation to each other while guided and protected against injury to their faces and edges.

The invention also comprises various details of construction by which improved efficiency is secured and operating troubles minimized.

Reference is hereby made to the accompanying drawings, of which

Fig. 1 is a fragmentary perspective view showing the means by which the boards are supported, guided and fed through the humidifying chamber;

Fig. 2 is an end elevation and

Fig. 3 is a plan of the complete humidifier;

Fig. 4 is a side elevation of the same;

Fig. 5 is a side elevation of the means for driving the supporting and feeding rolls of Fig. 1;

Fig. 6 is an enlarged detail side elevation of the board supporting and guiding means;

Fig. 7 is a transverse vertical section of a portion of the humidifying chamber, showing the board supports and guides in elevation;

Fig. 8 is a side elevation of the means for tensioning the guide wires;

Fig. 9 is a plan of the same; and

Fig. 10 is a section on line 10—10 of Fig. 9.

The humidifier shown comprises an elongated, horizontal, rectangular chamber 1 open at each end, through which the boards are fed. This chamber has side walls 2 and a top wall or roof 3 formed of wall boards secured to any suitable wood and metal frame 4 which is supported upon a foundation 5.

The means for supporting and feeding the boards *a*, which ordinarily consist of long and comparatively narrow rigid sheets, consist of a multiplicity of spaced rollers 6 upon which the boards rest edge wise in vertical planes, being arranged with their longest dimension lengthwise of the chamber 1. The rollers are provided with supporting shafts 7 journaled in suitably supported bearings 8. Each roller shaft 7 is provided with a driven sprocket 9. The various sprockets are driven very slowly and at the same rate of speed by an electric motor 10 and speed reducing gear 11, the latter comprising a sprocket 12 which drives the sprockets 13, 13, and through said sprockets by means of chains 14, 14, the sprockets 9.

The movement of the rollers 6 is preferably continuous and very slow. A low rate of feed is desirable, as it makes it possible to load the rollers continuously with successive increments of boards and to sufficiently humidify each board without interrupting its passage through a chamber of reasonable length. In the apparatus shown the rate of feed of the boards $a$ may be as low as 17 feet per hour, or even less.

Guiding means for maintaining the boards $a$ in a vertical position during their passage through the humidifying chamber are provided as follows: Upper and lower set of parallel wires 15 are secured at the entrance end of the chamber to transverse supports 16 and 17 respectively which are united to the frame, see Fig. 6.

The upper wires 15 pass from a support 16 through openings in the extremities of guide members or fingers 18. These members are arranged in sets, see Fig. 1, the fingers of each set being clamped in parallel spaced relation to each other by through bolts 19 (Figs. 6 and 7) and spacers 20.

Each set of guide fingers is clamped between transverse supporting beams. The fingers at the entrance end of the apparatus are clamped between the channel 16 and I beam 21 by bolts 22 and the intermediate guide fingers are similarly clamped between channels 23 and 24 by bolts 25.

Each of the wires 15 extends throughout the length of the humidifying chamber and at the exit end is secured to a suitable tension device, Figs. 8 to 10. As shown, such device comprises a metal drum 26 having a bar 27 welded thereto. The bar 27 has sockets 28, one for each of the upper set of wires 15 which is held therein by set screw 29. The drum 26 is mounted on a shaft 32 which is journaled in the bearings 30 secured to the vertical frame member 31, and upon either extremity of the shaft is a hub 33 having an arm 34 rigid therewith.

The hub has a projection 35 formed with an eye to which is pivoted one end of a turnbuckle 36. The other end of the turnbuckle receives one end of a wire rope or cable 37 which passes over the end of the arm 34, occupying a groove formed therein. The cable passes hence to a grooved sheave 38, its extremity being turned inward and secured thereto by clips 39.

The sheave 38 is journaled on a pivot pin or stud 40 rigid with the block 41, the latter being secured to the arm 42 extending rearwardly from frame member 31 to which it is fastened. There is an arm 43 rigid with the sheave 38 and provided at its outer end with a grooved segment 44 which receives a wire cable 45. The upper end of the cable 45 is secured to the segment by the clips 46 and the lower end carries a weight 47.

It is evident from the foregoing that the entire series of upper wires 15 are kept taut throughout their entire length, since they pass freely through the openings in the guide fingers 18.

The lower wires 15 are supported by means which are a substantial duplicate of the supporting means for the upper wires except that they are inverted with respect thereto, so that the lower guide fingers 18' extend upward from their points of support instead of downward, the entrance ends of the lower wires extend downward and are secured to the channel beam 17 and the exit ends of said wires extend downward to the tension drum 26'.

The tension means previously described operates to actuate the drum 26' acting through the sheave 38, cable 37' and arm 34'.

The lateral spacing of the guide fingers is preferably greater than twice the thickness of a single board so that in case boards having one smooth finished surface are being treated they may be placed face to face between adjacent guides, whereby the finished surfaces are protected against being scratched or otherwise marred during their passage through the apparatus or their insertion within the same or withdrawal therefrom.

The guide fingers 18 and 18' are preferably formed as shown with shoulders 48 which abut against the transverse supporting beams and with tapered lateral surfaces 49 which are cut away at 50. The tapered surfaces engage the forward ends of the boards as they are fed through the humidifier and deflect them sufficiently to clear the guide finger.

In operating the apparatus described the boards $a$ are loaded into the left hand end of the humidifier as shown in Figs. 3 and 5, or the right hand end as in Fig. 1. The boards rest upon the driven rollers 6 and are slowly fed through the humidifier being removed at the exit end thereof. During such transit, the boards are subjected to a humidifying atmosphere created as follows:

Referring to Figs. 2 and 4, the roof of the chamber 1 is cut away to receive a row of nozzles 51 depending from an air trunk 54 for introducing into the chamber 1 air substantially saturated with water vapor which is forced in continuously by the blower of one or more humidifying units 53 of known construction. Two such units are shown, one for supplying a two-way air trunk 52, and the other for supplying a one way air trunk 54. The trunk 52 is also provided with nozzles similar to the nozzles 51 of trunk 54.

Each of the units 53 is provided with known control means for varying the percentage of water vapor in the mixture supplied thereby, and by using two such units for separately supplying different sections of the chamber 1, very perfect control of the humidifying conditions within such chamber is obtainable.

The roof 3 of the chamber 1 is provided with a double row of air outlet openings 55, each one being provided with a regulating slide 56 for varying the size of the outlet, and in addition curtains may be placed at each end of the chamber for varying the extent of opening thereof. It should be noted, (see Figs. 1, 2, and 7), that the boards may be arranged in parallel vertical planes, and with the boards of contiguous planes aligned with each other in a direction transverse to said planes, thereby forming narrow vertical air conduits which are open at top and bottom.

The apparatus is so designed as to cause the air from the nozzles 51 to travel in a substantially closed path, part of which travel consists of upward movement through the multiplicity of narrow vertical conduits formed by the boards as above described. Such subdivision of the air current results in at least one face of each board being constantly bathed in a current of humid air whereby the moisture content of the board is increased. The molecules of the humid air mixture probably average several complete revolutions in their path as shown by the arrows Fig. 2 between the inlet nozzle 51 and relief outlet 55, (Fig. 3).

This result is obtained by leaving a space $b$ along the center of chamber 1 between the boards $a$ and mounting deflectors 57 on the floor of the chamber for turning the laterally spreading air currents in an upward direction, as shown by the arrows. These ascending currents as they leave the vertical conduits formed by the boards and enter the upper part of the chamber are caused to turn laterally or inwardly to complete a closed or substantially closed path by the injector action of the nozzles 51. Excess air substantially free of its moisture content may be released through the relief outlets 55, Fig. 3.

As will be noted, one or both of the faces of each of the boards $a$ and all of the edges thereof will while traveling through the chamber 1 be bathed in a continuous current of humid air from which the board will absorb sufficient moisture to bring its water content up to the desired percentage. By reason of the thorough circulation of the air mixture in a substantially closed path and its close contact with a large area of board surface, the moisture is abstracted therefrom in a very efficient manner, whereby the cost of operating the humidifying units 53 is minimized. The water vapor readily penetrates the boards especially at the edges and is absorbed thereby. Any excess of water content in the portions of the boards adjacent the edges will gradually become absorbed into the more central portions.

The boards after being removed from the press should have their four edges trimmed in order to remove irregularities and to obtain boards of uniform size. This trimming operation is preferably performed upon the boards as they leave the humidifier, so that in case the edges have become marred in handling or in their passage through the humidifier, the damaged portions will be removed.

I claim:

1. The process of producing hard, dense, vegetable fiber boards, substantially free from warping on exposure to the atmosphere, which consists in forming sheets of wet fibrated lignocellulose material containing a large percentage of the lignin of the original material, subjecting said sheets to pressure and heat sufficient to cause a substantial bonding or consolidating of the fibrated material into a substantially dry hard board of high specific gravity, arranging said boards in parallel planes separated by narrow spaces to form air passages or conduits, and in passing currents of humid air through said conduits until the boards absorb a water content sufficient to substantially prevent such warping.

2. The process of claim 1 in which the boards are arranged in vertical planes to form conduits open at top and bottom.

3. The process of claim 1 in which the boards are caused to absorb moisture to obtain a water content of approximately 7% of the dry weight of the board.

4. The process of increasing the water content of vegetable fiber boards which consists in arranging such boards in parallel vertical planes separated by narrow spaces to form a multiplicity of vertical conduits open at top and bottom, passing vertical currents of humid air through said conduits until the boards absorb a desired percentage of moisture, said air currents being caused to flow into and out of said conduits in substantially closed paths, and in continuously supplying humid air to said currents at one part of said path and permitting escape of air of diminished humidity at another part of said path.

5. The process of claim 4 in which the boards are caused to travel progressively in the direction of their planes while contacted by currents of humid air.

6. The process of claim 4 in which the boards are arranged in two sets separated by a wide space to permit vertical flow of air in sufficient volume to supply a multiplicity of conduits formed by the boards of each group.

WILLIAM H. MASON.